(12) United States Patent
Shouda (10) Patent No.: US 10,175,426 B2
(45) Date of Patent: Jan. 8, 2019

(54) ADAPTER, AND OPTICAL PLUG AND OPTICAL COMMUNICATION MODULE USED WITH ADAPTER

(71) Applicant: KYOCERA Corporation, Kyoto-shi, Kyoto (JP)

(72) Inventor: Michifumi Shouda, Kitami (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 15/580,649

(22) PCT Filed: Aug. 26, 2016

(86) PCT No.: PCT/JP2016/075040
§ 371 (c)(1),
(2) Date: Dec. 7, 2017

(87) PCT Pub. No.: WO2017/038704
PCT Pub. Date: Mar. 9, 2017

(65) Prior Publication Data
US 2018/0164510 A1 Jun. 14, 2018

(30) Foreign Application Priority Data
Sep. 2, 2015 (JP) .................................. 2015-173011

(51) Int. Cl.
*G02B 6/38* (2006.01)
*G02B 6/42* (2006.01)

(52) U.S. Cl.
CPC ......... *G02B 6/3831* (2013.01); *G02B 6/3825* (2013.01); *G02B 6/421* (2013.01); *G02B 6/4292* (2013.01); *G02B 6/423* (2013.01)

(58) Field of Classification Search
None
See application file for complete search history.

(56) References Cited

U.S. PATENT DOCUMENTS

| 4,832,435 A | * | 5/1989 | Suzuki | G02B 6/264 |
| | | | | 385/83 |
| 5,276,752 A | * | 1/1994 | Gugelmeyer | H01R 13/6277 |
| | | | | 385/55 |

(Continued)

FOREIGN PATENT DOCUMENTS

| JP | 02-041202 U | 3/1990 |
| JP | 2000-206373 A | 7/2000 |

(Continued)

OTHER PUBLICATIONS

International Search Report, PCT/JP2016/075040, dated Nov. 22, 2016, 2 pgs.

*Primary Examiner* — Ryan Lepisto
*Assistant Examiner* — Erin Chiem
(74) *Attorney, Agent, or Firm* — Volpe and Koenig, P.C.

(57) ABSTRACT

An adapter is cylindrical and includes a first groove and a locking structure. The first groove is adjacent to an inner peripheral surface at one end of the adapter. The first groove extends in an axial direction of the adapter and turns in a circumferential direction. The locking structure is disposed in a circumferential direction at an outer peripheral surface at other end of the adapter. An optical plug includes an elastic member and a stopper. The elastic member is at a rear end of a holder. The stopper includes an annular portion that is in contact with the elastic member and arm portions bent toward the front end from an outer periphery of the annular portion. Each of the arm portions includes a hook at a front end of the stopper. The hook is configured to be locked into the adapter. The optical plug is attached via the adapter.

8 Claims, 6 Drawing Sheets

(56) References Cited

U.S. PATENT DOCUMENTS

| | | |
|---|---|---|
| 2002/0197022 A1 | 12/2002 | Mine et al. |
| 2010/0008630 A1* | 1/2010 | Marrapode .......... G02B 6/3897 |
| | | 385/78 |
| 2011/0052126 A1 | 3/2011 | Yamamoto et al. |
| 2011/0103797 A1 | 5/2011 | Oki et al. |
| 2011/0225792 A1 | 9/2011 | Oki et al. |
| 2011/0229095 A1 | 9/2011 | Oki |
| 2011/0229096 A1 | 9/2011 | Oki |
| 2011/0255831 A1 | 10/2011 | Oki et al. |
| 2011/0262078 A1 | 10/2011 | Oki et al. |
| 2012/0237171 A1 | 9/2012 | Oki |
| 2012/0237223 A1 | 9/2012 | Matsui et al. |
| 2015/0378107 A1 | 12/2015 | Akashi et al. |

FOREIGN PATENT DOCUMENTS

| | | |
|---|---|---|
| JP | 2009-514038 A | 4/2009 |
| JP | 2012-068462 A | 4/2012 |
| JP | 5279820 B2 | 9/2013 |
| WO | 2015/012183 A1 | 1/2015 |

* cited by examiner

ADAPTER, AND OPTICAL PLUG AND OPTICAL COMMUNICATION MODULE USED WITH ADAPTER

TECHNICAL FIELD

The present invention relates to a splice structure for use in a connector for optical fibers, and relates to an adapter that can be connected to an optical receptacle, and an optical plug and an optical communication module that are used with the adapter.

BACKGROUND ART

Optical communication modules are used in optical communication using optical fibers. The optical communication module includes an optical receptacle and an optical element unit. The optical element unit houses, within the housing of the optical element housing package, an optical element such us a light emitting element, e.g. a laser diode (LD), or a light receiving element, e.g., a photodiode (PD). A holder of the optical receptacle is secured to the optical element unit via an alignment adapter.

The fiber stub and the sleeve of an optical receptacle disclosed in JP 5279820 B are covered with a sleeve case for protecting them. The optical plug is housed within a housing for protecting a plug ferrule. When the plug ferrule and the fiber stub are connected to each other, the housing is placed over the outside of the sleeve case and covers it.

Furthermore, to maintain the fit between the optical receptacle and the optical plug, a latch mechanism, for example, needs to be provided at the outside. Thus, in the structure, the plug ferrule and the fiber stub are covered with a sleeve case and a housing, and therefore size reduction is limited.

SUMMARY OF INVENTION

An adapter according to an embodiment of the present invention is cylindrical. The adapter includes a first groove and a locking structure. The first groove is formed adjacent to an inner peripheral surface at one end of the adapter, the first groove extending in an axial direction of the adapter and then turning in a circumferential direction thereof. The locking structure is provided in a circumferential direction at an outer peripheral surface at other end of the adapter, the locking structure including protrusions and recesses configured to allow an optical plug for an optical connector to be locked therein, and the optical plug being configured to be coupled to the adapter.

An optical communication module according to an embodiment of the present invention includes an optical communication package, an optical component assembly, and the adapter according to any one of the above, and an optical plug. The optical communication package includes an optical element housed therein. The optical component assembly includes a light guide member, a tubular member, and a projection, the light guide member being joined to an exit end of the optical communication package, the tubular member holding the light guide member within a through hole of the tubular member, the projection extending outward of an outer peripheral surface of the tubular member at one end thereof. The adapter is secured to the optical component assembly with the first groove being engaged with the projection of the optical component assembly. The optical plug is locked in the locking structure of the adapter.

DESCRIPTION OF EMBODIMENT

Examples of embodiments of the present invention are described below with reference to the drawings. Throughout the drawings, like elements are referred to by like designations and are assigned like numerals.

Figure 1:
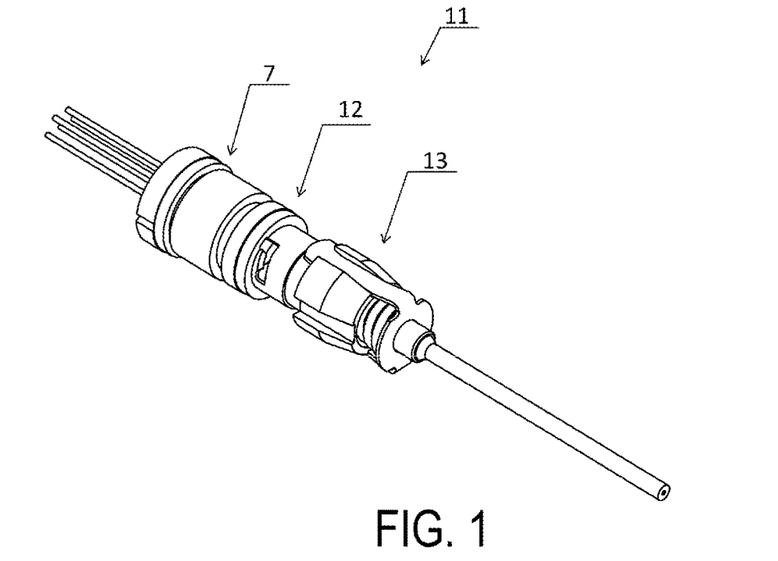
FIG. 1 is a perspective view of an optical communication module according to an example of an embodiment of the present invention.
Figure 2:
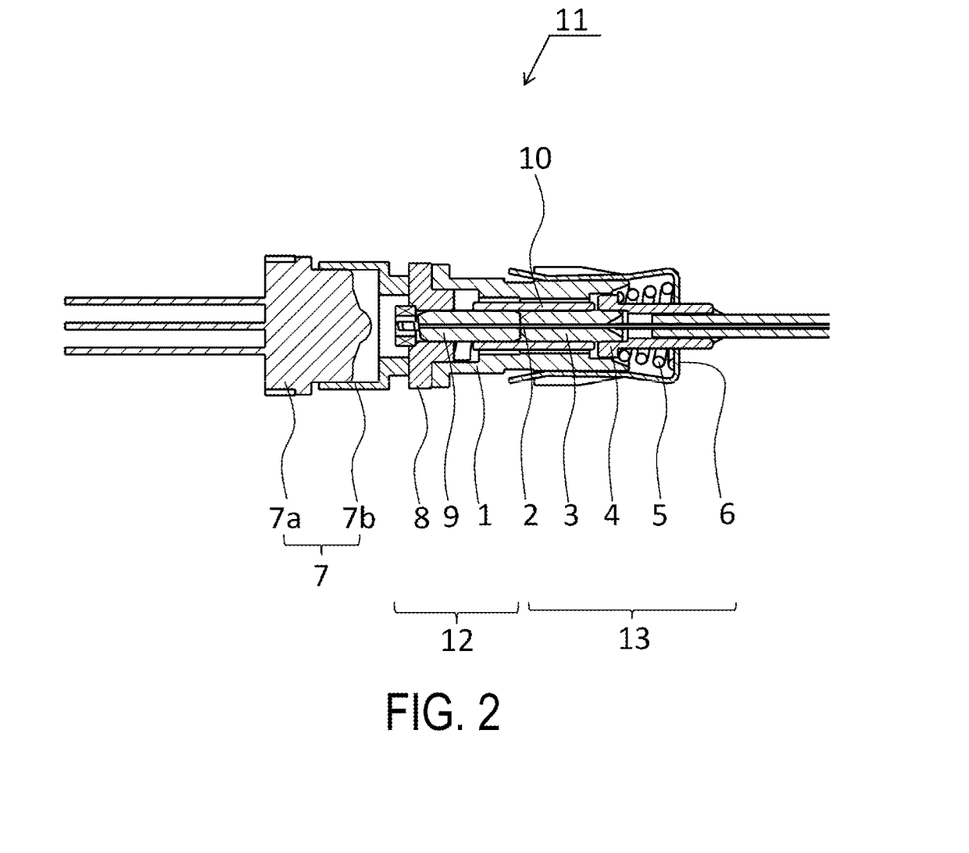
FIG. 2 is a cross-sectional view of the optical communication module in FIG. 1, illustrating a cross section thereof containing the central axis.
Figure 3:
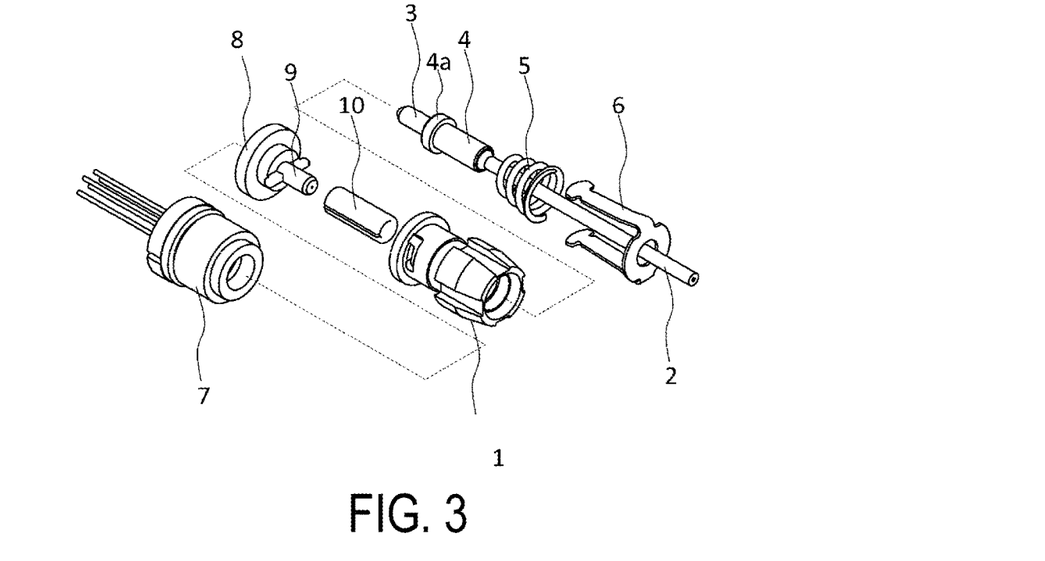
FIG. 3 is an exploded perspective view illustrating the parts, in an exploded state, of the optical communication module illustrated in FIG. 1.
Figure 4:
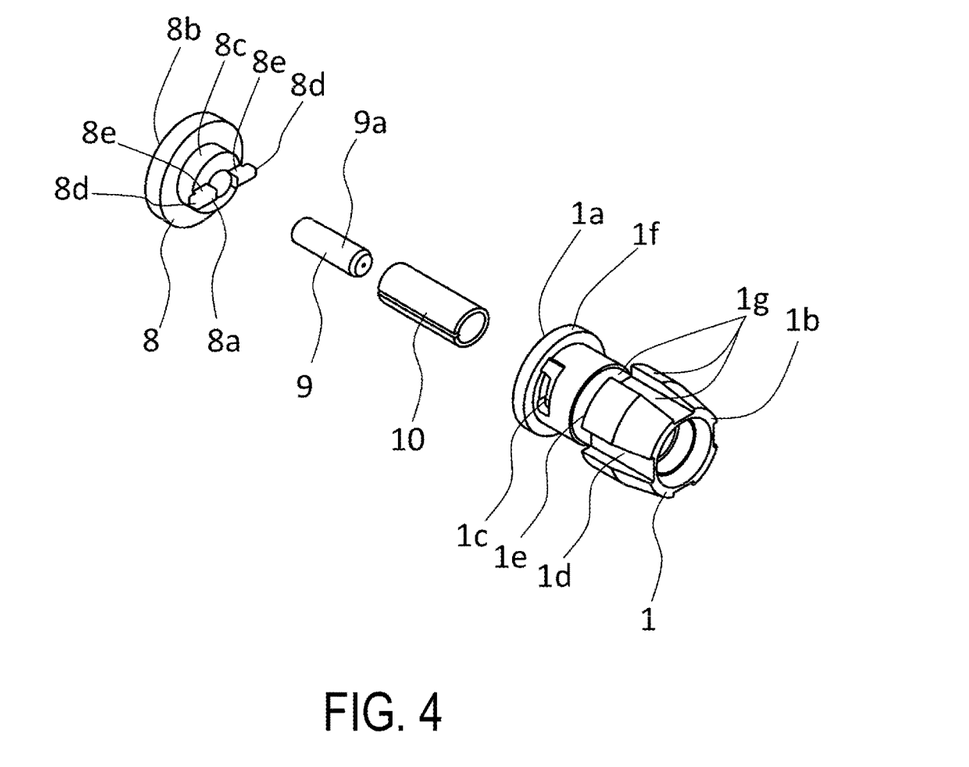
FIG. 4 is an enlarged exploded perspective view illustrating some of the parts of the optical communication module illustrated in FIG. 3.

FIG. 1 is a perspective view of an optical communication module 11 according to an embodiment of the present invention, illustrating an example of the embodiment. FIG. 2 is a cross-sectional view of the optical communication module 11 in a cross section taken along the central axis. FIG. 3 is an exploded perspective view illustrating the parts, in an exploded state, of the optical communication module in FIG. 1. In FIG. 2, the interior of an optical element housing package 7a is hatched and not illustrated in detail. FIG. 4 is an enlarged exploded perspective view of a portion extending from a tubular member 8 to an adapter 1 in FIG. 3.

The optical communication module 11 is a combination of an optical element unit 7, an optical plug receiver 12, the adapter 1, and an optical plug 13 portion. The optical unit 7 includes the optical element housing package 7a and an alignment adapter 7b. The optical plug receiver 12 portion includes the tubular member 8, a light guide member 9 and a sleeve 10. The optical plug 13 includes a plug ferrule 3, a holder 4, an elastic member 5, and a stopper 6. In the following, descriptions will be given in order.

In the optical plug receiver 12 portion, the tubular member 8 portion is joined, via the alignment adapter 7b, to the optical element housing package 7a, in which an optical element, such as a LD or PD, is housed. The tubular member 8 will be described with reference to FIG. 4.

The tubular member 8 is a component having a generally cylindrical shape and has a through hole along the central axis. The tubular member 8 includes, at one end 8a, projections 8d, which extend outward of an outer peripheral surface 8c. Also, the tubular member 8 may include, at other end 8b, a flange portion having a larger diameter. The projections 8d may project from the outer peripheral surface 8c at the one end 8a of the tubular member 8. On the end surface of the one end 8a of the tubular member 8, protruding portions 8e may be provided to protrude in an axial direction of the tubular member 8. The projections 8d may extend outward from the side surfaces of the protruding portions 8e. The side surfaces of the protruding portions 8e are contiguous with the outer peripheral surface 8c.

The projections 8d may be provided at the one end 8a of the tubular member 8, at more than one symmetrical locations with respect to the axis of the tubular member 8. When a plurality of the projections 8d are to be provided, they may be provided at locations that are equally spaced along the outer peripheral surface 8c and are rotationally symmetrical. For example, when they are to be provided at three locations, they may be provided at the vertices of an equilateral triangle inscribed within the outer peripheral surface 8c so that adjacent ones of the locations are spaced apart from each other at an angle of 120°. FIG. 4 illustrates an example in which the projections 8d are disposed at two locations with respect to the central axis of the tubular member 8. As described above, the projections 8d may be provided at least two locations to thereby stabilize the securement of the adapter 1. Furthermore, the adapter 1 can be secured so as to prevent tilting of the axis.

The light guide member 9 is secured within the through hole of the tubular member 8 to form an optical component assembly. The light guide member 9 has the function of transmitting light. FIG. 4 illustrates an example in which a fiber stub 9a is used, but instead, a glass plate, a molded glass body, or a transparent crystalline body, for example, may be used. The fiber stub 9a is a cylindrical ferrule having a central hole in which an optical fiber is inserted from the rear end of the hole through to the front end thereof. The rear end portion of the fiber stub 9a is secured to the inner hole of the tubular member 8 by press-fitting or by adhesive-bonding, for example, to be held by the tubular member 8. The rear end portion includes the rear end surface of the fiber stub 9a.

An optical isolator element may be disposed at the rear end surface of the fiber stub 9a. The optical isolator element is, for example, formed by a polarizer, a Faraday rotator, and an analyzer that are bonded to one another in that order. Rotation alignment is performed so that the transmittance polarization planes of the polarizer and the analyzer form an angle of 45°, and an adhesive is applied to bond them to each other. Then, cutting is performed to produce pieces of a parallelepiped shape sized to be received inside the outer periphery of the rear end surface of the fiber stub 9a. The cut optical isolator element is secured to the rear end surface of the fiber stub 9a by adhesive bonding, for example.

The tubular member 8 and the light guide member 9, assembled together as described above, are joined via the alignment adapter 7b to the optical element housing package 7a, in which an optical element is housed. The joining may be carried out by, for example, yttrium aluminum garnet (YAG) laser welding. In this manner, the optical element unit 7, which includes the optical plug receiver 12, is completed. In the joining process, optical alignments are performed so that the optical element and the light guide member 9 can be optically coupled to each other.

The sleeve 10 is inserted so as to be placed over the front end portion of the fiber stub 9a and secured. The sleeve 10 has a cylindrical shape, and the rear end (left end in FIG. 4) portion thereof is placed over the front end (right end in FIG. 4) portion of the fiber stub 9a and secured thereto. The front end of a plug ferrule 3, through which an optical fiber 2 is inserted, is inserted within the cylinder of the sleeve 10 at the front end (right end in FIG. 4) portion, and the front end surface is brought into abutment with the front end surface of the fiber stub 9a. Thus, the optical fiber within the fiber stub 9a and the optical fiber 2 within the plug ferrule 3 are abutted against each other concentrically to connect the optical fibers to each other.

The sleeve 10 may be a split sleeve 10 having a slit in an axial direction. The split sleeve 10 has an inside diameter slightly smaller than the outside diameter of the fiber stub 9a or the plug ferrule 3. When the fiber stub 9a or the plug ferrule 3 is inserted from the corresponding end, the slit expands to enlarge the inside diameter of the split sleeve 10, and the split sleeve 10 holds the fiber stub 9a and the plug ferrule 3 by its elastic force so that they can be coaxially aligned. The elastic force of the sleeve 10 causes the inner peripheral surface of the sleeve 10 to be in close contact with the outer peripheral surfaces of the fiber stub 9a and the plug ferrule 3 and thus the fiber stub 9a and the plug ferrule 3 are held with a small clearance. As a result, the light propagating through the optical fibers 2, which are inserted through the fiber stub 9a and the plug ferrule 3, can be efficiently coupled to each other.

The adapter 1 is placed over the outside of the sleeve 10. The adapter 1 is used to protect the sleeve 10 and prevent the sleeve 10 from falling off from the fiber stub 9a. The adapter 1 is attached to the tubular member 8. The adapter 1 is produced by processing a metal, ceramics, or a resin, for example. Resins have good moldability and are inexpensive and insulating, and therefore are suitable for the adapter 1 according to the embodiment. The adapter 1 will be described with reference to FIG. 4.

The adapter 1 is used by being coupled to an optical plug for an optical connector. The adapter 1 is a component having a generally cylindrical shape and having a through hole along the central axis. The adapter 1 includes first grooves 1c that are bent in an L-shape. Each of the first grooves includes an axial groove formed in the inner peripheral surface of one end 1a portion and a groove extending in a circumferential direction of the adapter 1 from the proximal end of the axial groove. The adapter 1 can be attached to the tubular member 8 by engaging the projections 8d of the tubular member 8 with the grooves 1c.

That is, the tubular member 8 and the adapter 1 are configured to be attached to each other by a method referred to as bayonet mounting. The projections 8d serve as pawls or radial pins and the grooves 1c serve as L-shaped slots. The projections 1d are positioned in place at the ends of the axially formed groove portions of the first grooves 1c and the adapter 1 is inserted along the axial direction over the fiber stub 9a and the sleeve 10. Then, when the projections 8d reach the proximal ends of the axial groove portions, the adapter 1 is rotated to slide the projections 8d along the circumferential groove portions until the projections 8d reach the terminal ends of the first grooves 1c. The first grooves 1c, at the terminal ends of the first grooves 1c, are formed slightly wider toward the rear end of the adapter 1 so as to receive and retain the projections 8d therein for securement.

The circumferential groove portion of each of the first grooves 1c may be slightly slanted in a direction such that the distance between the circumferential groove portion and the one end 1a of the adapter 1 increases toward the terminal end. With this configuration, as the adapter 1 is rotated and secured, the one end 1a surface of the adapter 1 is pressed against the tubular member 8 to be firmly secured. Furthermore, the elastic stress against the compressive force applied to the adapter 1 acts as a spring force to secure the adapter 1 to the tubular member 8.

In an example according to the embodiment, the adapter 1 includes, at the one end 1a portion, a flange-shaped protruding portion 1f. In the region of the protruding portion 1f, the first grooves 1c are formed as U-shaped bottomed grooves. In the region where the protruding portion 1f is not present, the first grooves 1c are formed as slot-shaped holes. Thus, the first grooves 1c may be formed as a slot bored from the inner surface of the adapter 1 through to the outer surface thereof, or as in the embodiment, the first groove 1c may be formed as a groove in some part, while being formed as a slot for the rest.

The adapter 1 includes a locking structure including protrusions and recesses 1g on the outer peripheral surface at other end 1b. The protrusions and recesses 1g lock the optical plug for an optical connector, which will be described later, when the optical plug is coupled. The protrusions and recesses 1g are protrusions and recesses formed by some grooves formed in the outer peripheral surface. In the example illustrated in FIG. 4, the recesses of the protrusions and recesses 1g of the locking structure are embodied by a second groove. The second groove includes axial grooves 1d (also referred to as guide grooves 1d) and a locking groove 1e formed in a circumferential direction at one end (front end) of the axial groove 1d. For example, the protrusions and recesses 1g may have a recess depth, i.e., depths of the grooves 1d and the locking groove 1e, of from 20 to 70% relative to the thickness of the locking structure. In the protrusions and recesses 1g, the deeper the recesses, the better the optical plug can be caught therein. As a result, the effect of locking the optical plug is enhanced. In the protrusions and recesses 1g, the shallower the recesses, the thicker the thickness of the adapter 1 can be. As a result, the strength of the adapter 1 is maintained.

The guide grooves 1d are disposed parallel to the central axis of the adapter 1. The guide groove 1d may be a plurality of guide grooves formed in more than one symmetrical locations with respect to the central axis of the adapter 1. In FIG. 4, the guide groove 1d is made up of four grooves formed in four locations. The number of the guide grooves 1d may be an integer multiple of the number of arm portions 6b, which are provided for the stopper 6. As many guide grooves 1d as possible may be disposed.

The optical plug 13 can be attached to the adapter 1 in such a manner that the plug ferrule 3 is inserted into the sleeve 10, which is inside the through hole. The optical plug 13 is secured to one end of the optical fiber 2. The front end of the optical fiber 2 is inserted through through holes of the plug ferrule 3 and the holder 4 provided in an axial direction, and secured to the through holes of the plug ferrule 3 and the holder 4 by an adhesive, for example. The outsides of the plug ferrule 3 and the holder 4 are covered by the adapter 1 to be protected.

The portions of the optical plug 13 will be described with reference to FIG. 3. The plug ferrule 3 is a cylindrical ferrule. The optical fiber 2 is inserted through the central hole from the rear end to the front end. The rear end (right in FIG. 3) portion, which includes the rear end surface, of the plug ferrule 3 is secured to the inner hole of the holder 4 by press-fitting or by adhesive-bonding to be held by the holder 4.

The holder 4, which is substantially cylindrical, has a through hole along the central axis and holds a rear end portion of the plug ferrule 3 and the optical fiber 2 within the through hole. The holder 4 includes, at the front end, a flange portion 4a, which has a larger outside diameter. In many cases, the holder 4 is produced from metal such as stainless steel. The holder 4 may be produced from a resin or a different material.

The elastic member 5 is provided to apply pressure in a direction in which the holder 4 and the plug ferrule 3 are pressed into the sleeve 10 within the adapter 1. FIG. 3 illustrates an example in which a coil spring is used. The elastic member 5 is biased by being interposed and compressed between an annular portion 6a of the stopper 6 and the holder 4. As illustrated in FIG. 2, the front end of the coil spring is in contact with the flange 4a of the holder 4. The elastic member 5 is not limited to a coil spring and, for example, may be an elastic tubular member formed from, for example, a resin material such as rubber or another material.

FIG. 3 illustrates an example in which the elastic member 5 is a conical coil spring. That is, the elastic member 5 has a conical shape in which the coil diameter at the front end (the end that contacts the holder 4) of the coil spring is small and the coil diameter at the rear end (the end that contacts the annular portion 6a of the stopper 6) is large. When a conical coil spring is employed as the elastic member 5, the length of the coil spring can be shorter, and as a result, the optical plug 13 can be reduced in size.

Figure 5:
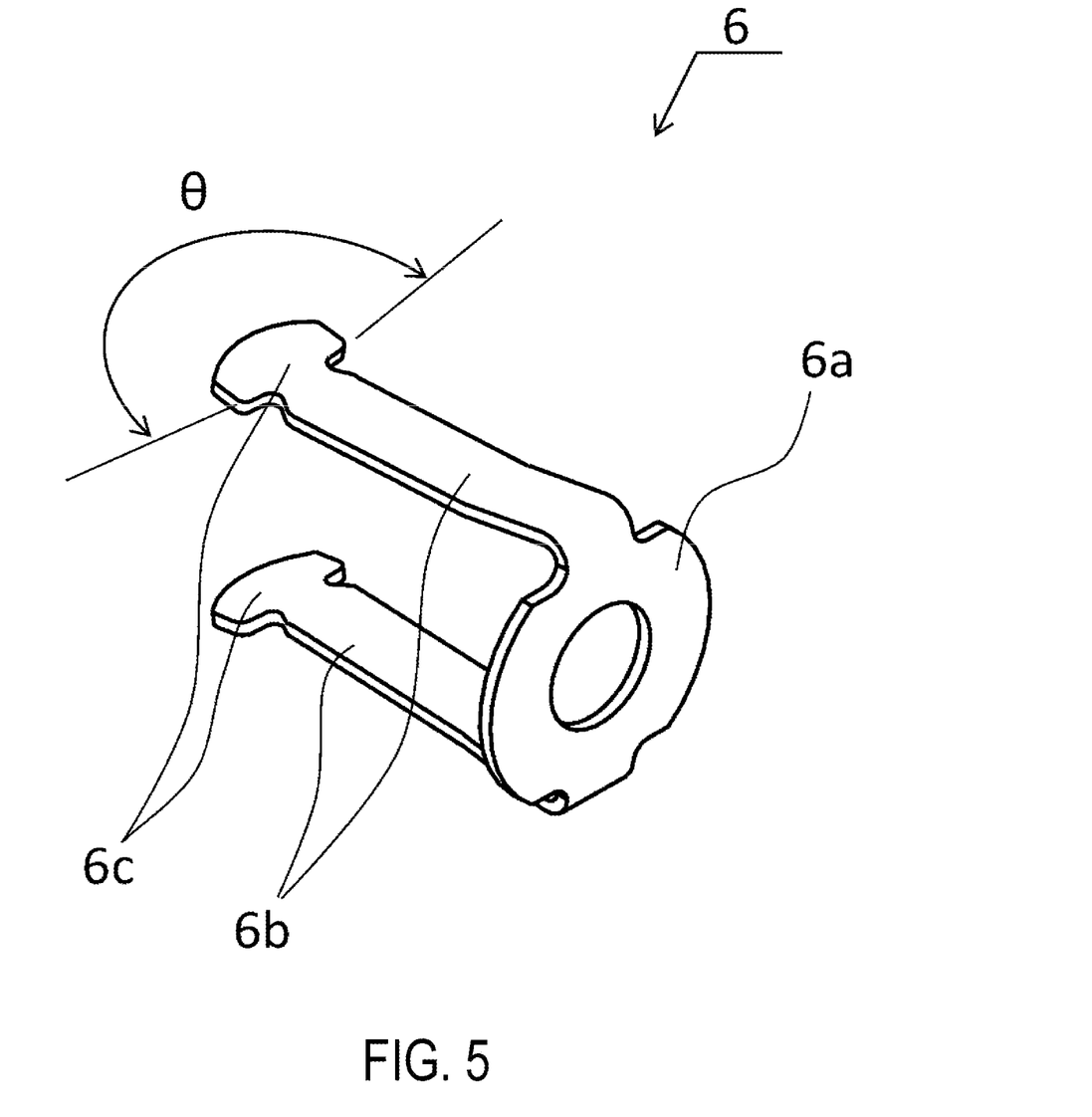
FIG. 5 is an enlarged exploded perspective view illustrating a stopper portion of the optical communication module illustrated in FIG. 3.
Figure 6:
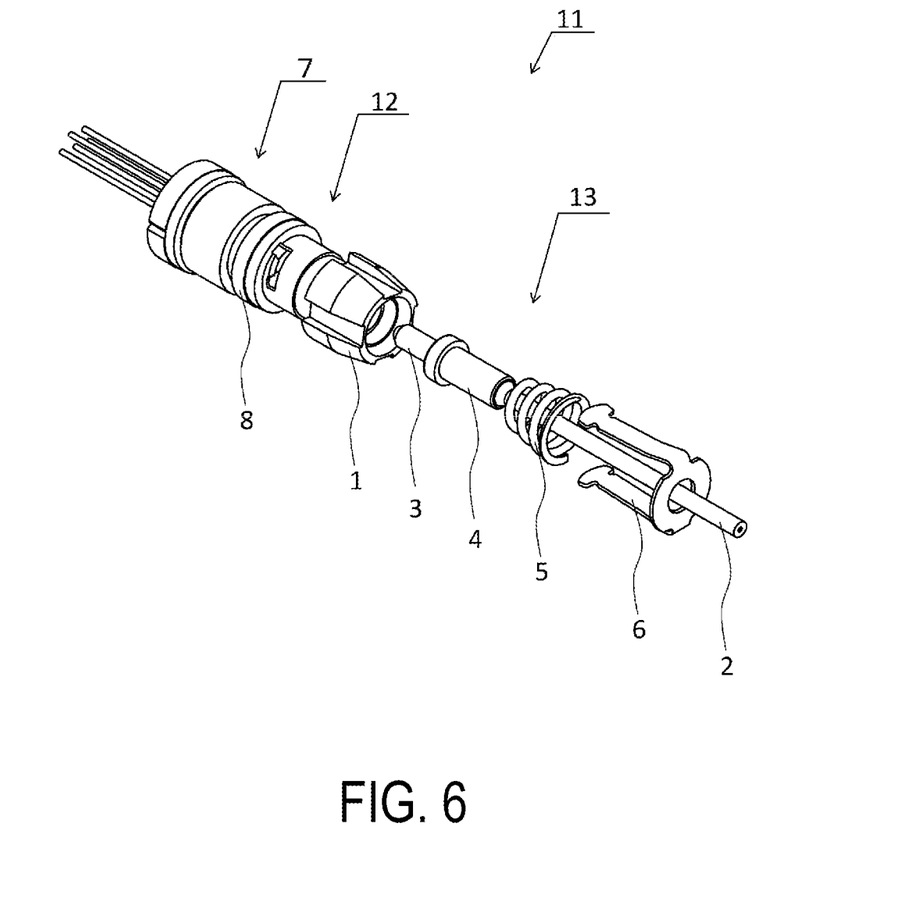
FIG. 6 is an exploded perspective view illustrating an optical plug portion, in an exploded state, of the optical communication module illustrated in FIG. 1.

FIG. 5 is an enlarged view of the stopper 6. In the following, the stopper 6 will be described with reference to FIG. 5.

The stopper 6 includes the annular portion 6a and the arm portions 6b. The annular portion 6a has an opening in a center thereof. The arm portions 6b are connected to the outer periphery of the annular portion 6a. FIG. 5 illustrates an example in which two arm portions 6b are provided. Each of the arm portions 6b extends outward of the outer periphery of the annular portion 6a and is bent toward the front end of the optical plug 13. The two arm portions 6b are not parallel to each other and they are bent in such a manner that the distance between them slightly decreases toward the front end. The arm portions 6b each includes a hook 6c at the front end.

The hook 6c has a width wider than the remaining portions of the arm portion 6b and has side surfaces projecting on both sides. The hook 6c is formed via a neck portion having a slightly narrow width. The hook 6c is formed to have an open angle $\theta$ from the neck portion smaller than 180°. The open angle $\theta$ may range from 120 to 175°. In the embodiment, for example, the open angle $\theta$ is 170°.

The stopper 6 is attached to the adapter 1 with the elastic member 5 interposed therebetween, thereby biasing the elastic member 5. The stopper 6 is pressed toward the adapter 1 from the rear end of the elastic member 5 until the hooks 6c are locked in the locking groove 1e of the adapter 1, and thus is secured. When the securement is completed, part of each arm portion 6b is placed inside the axial guide groove 1d and the locking groove 1e. Since the arm portion 6b is constrained by the inner wall of the guide groove 1d, wobbling in the axial direction is reduced.

The stopper 6 may be secured to the adapter 1 after the adapter 1 is first secured to the optical plug receiver 12. It is possible to secure the stopper 6 to the adapter 1 first and then secure the adapter 1 to the optical plug receiver 12. However, in this case, since the adapter 1 needs to be rotated in the circumferential direction to secure the adapter 1, the optical fiber 2 in the plug ferrule 3 is also moved in the rotational direction. When this occurs, the front end surface of the optical fiber 2 has frictional contact in the rotational direction. When the front end surface of the optical fiber 2 is moved in frictional contact, the surface of the optical fiber 2 may be scratched.

On the other hand, when the stopper 6 is secured after the adapter 1 is secured to the optical plug receiver 12, movement of the front end surface of the optical fiber 2 in frictional contact can be avoided. This reduces the possibility of increased splice loss in the optical plug 13.

Furthermore, in the adapter 1, the plurality of guide grooves 1d may be provided in the circumferential direction. This configuration reduces the need to rotate the optical plug 13 to adjust the orientation when attaching the optical plug 13 to the adapter 1. As a result, the optical plug 13 has greater flexibility for attachment. For this reason, the plurality of arm portions 6b may be provided at rotationally symmetrical locations with respect to the central axis of the annular portion 6a (central axis of the stopper 6). When a plurality of arm portions 6b are provided at rotationally symmetrical locations, it is less likely that the stopper 6 will experience tilting in the axial direction.

Furthermore, the guide grooves 1d and the arm portions 6b are provided in the axial direction of the adapter 1, and therefore, loading is applied, by the elastic member 5, to the front end surface of the plug ferrule 3 in a direction normal thereto. As a result, the contact between the plug ferrule 3 and the light guide member 9 is stable. The hooks 6c are each formed to extend from the neck portion and have an open angle of less than 180°. Thus, the hook 6c is secured in point contact with the corner portion where the guide groove 1d and the locking groove 1e intersect each other perpendicularly. Since the hook 6c is secured via a point, the hook 6c can dig into the adapter 1 when the adapter 1 is made of an elastic material, and cannot be easily disengaged. As a result, the optical plug 13 cannot be easily disengaged and exhibits resistance to vibration and impact.

The optical plug 13 can be easily disengaged from the adapter 1 by disengaging the hook 6c from the locking groove 1e. Thus, one feature of the optical plug 13 is ease of attachment and detachment.

Figure 7:
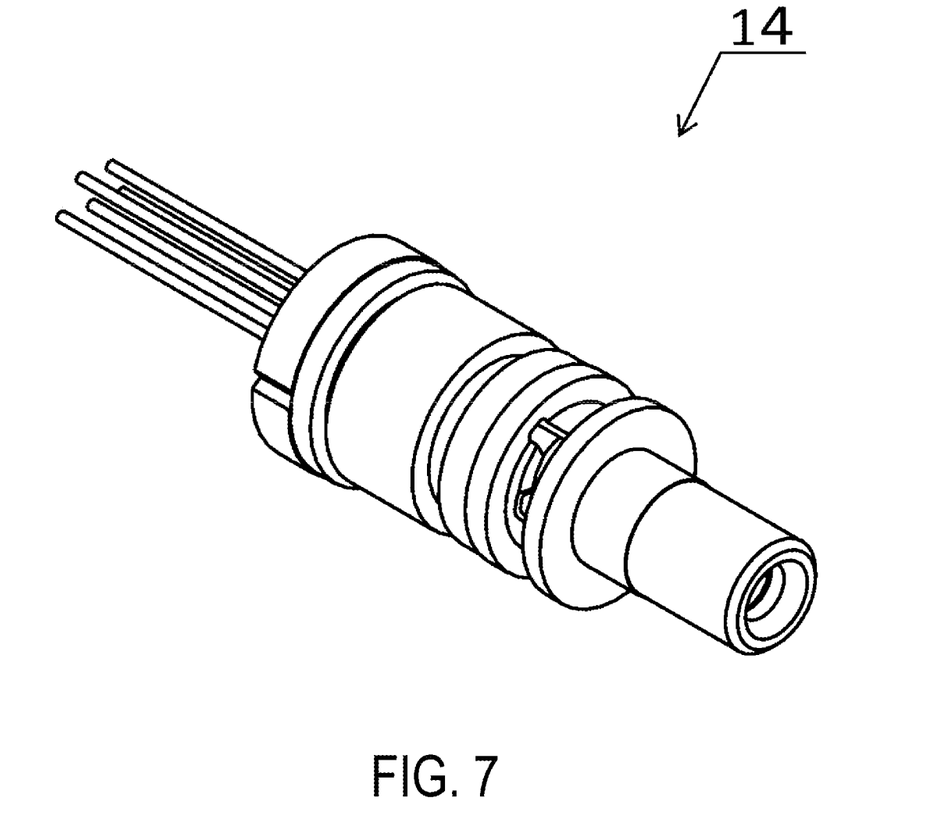
FIG. 7 is a perspective view illustrating an example of an optical receptacle-mounted optical communication module.
Figure 8:
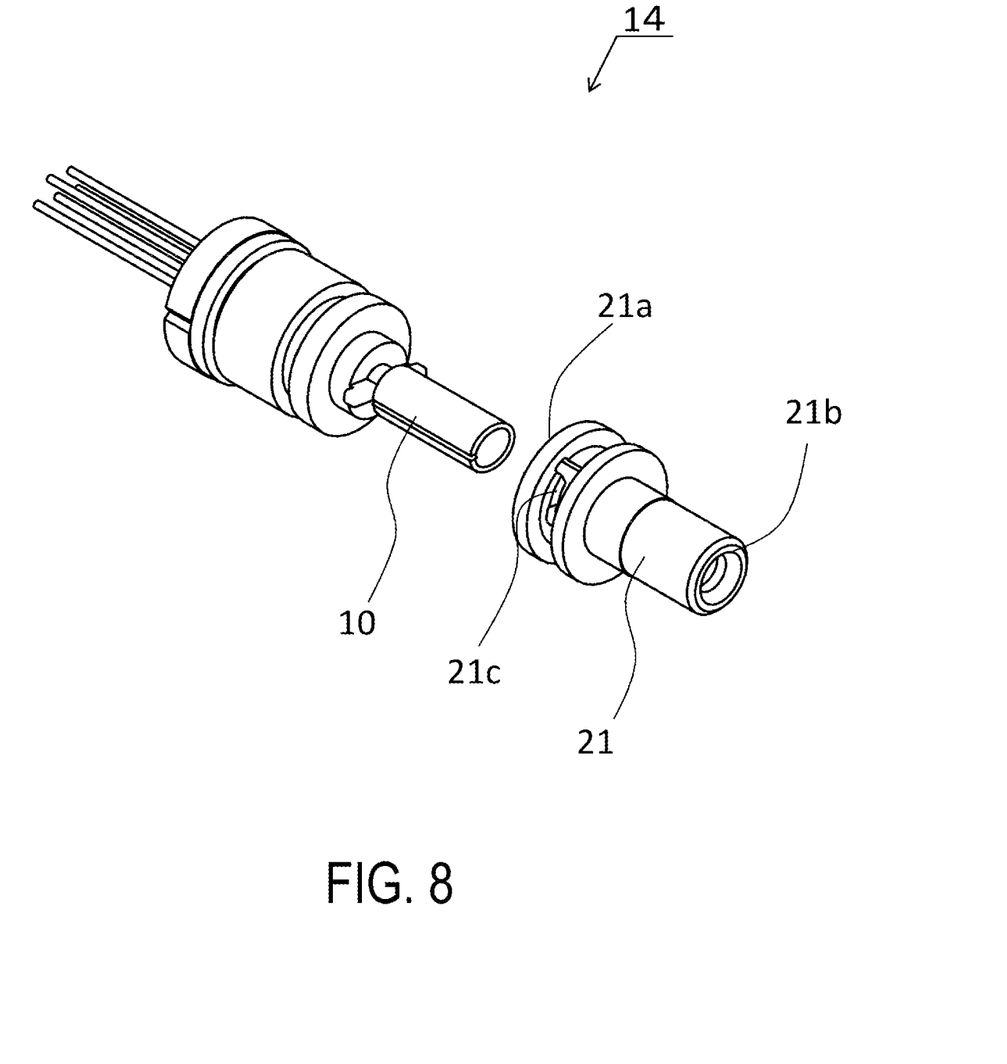
FIG. 8 is an exploded perspective view illustrating the optical receptacle portion, in an exploded state, of the optical receptacle-mounted optical communication module in FIG. 7.

As illustrated in FIGS. 7 and 8, the sleeve 10 and a sleeve case 21 may be secured to the optical plug receiver 12 portion to form an optical receptacle-mounted optical communication module 14 for use. As illustrated in FIG. 8, the sleeve case 21 includes L-shaped grooves 21c, each of which includes a groove located adjacent to a rear end 21a and extending in an axial direction of the sleeve case 21 and a groove extending in a circumferential direction of the sleeve case 21 from the proximal end of the axial groove. The grooves 21c have the same shape as the first grooves 1c, which are formed in the adapter 1. The projections 8d of the tubular member 8 can be engaged with the grooves 21c to secure the sleeve 21 to the tubular member 8. As with the adapter 1, the sleeve case 21 may be formed from a resin or metal.

The front end 21b portion of the sleeve case 21 has a tubular shape similarly to a sleeve case that is used for a typical optical receptacle. When the sleeve 10 is placed over the light guide member 9, e.g., fiber stub 9a, and the sleeve case 21 is secured thereto, the optical communication module 11 can be used as a module to which a typical optical receptacle is mounted. Thus, the optical communication module 11 is not only a module to which the optical plug 13 can be mounted but also is a module that can be used as it is in conventional applications and therefore is versatile.

Next, the following describes the materials and the production methods for the elements used in the optical communication module 11 according to the embodiment. The optical communication module 11 includes the tubular member 8, the fiber stub 9a or plug ferrule 3, the sleeve 10, the adapter 1, the holder 4, the elastic member 5, and the stopper 6.

The outside diameter of the fiber stub 9a depends on the size of the outside diameter of the plug ferrule 3, which is to be abutted against the fiber stub 9a. For optical connectors of the MU type and the LC type, a plug ferrule 3 approximately 1.25 mm in outside diameter is used. For optical connectors of the SC type, the FC type, and the ST type, a plug ferrule 3 approximately 2.5 mm in outside diameter is used. For optical connectors of the D4 type, a plug ferrule 3 approximately 2.0 mm in outside diameter is used. For the fiber stub 9a, basically, a fiber stub having the same outside diameter as the plug ferrule 3 is used.

The fiber stub 9a and the plug ferrule 3 are made of, for example, a metal, a plastics material such as an epoxy resin and a liquid crystal polymer resin, or a ceramic material such as alumina ceramics and zirconia ceramics. From the standpoint of mechanical properties, the ferrule may be formed from zirconia ceramics. Specifically, the ferrule may be made of partially stabilized zirconia ceramics, which are based on a tetragonal crystal. Such partially stabilized zirconia ceramics may contain $ZrO_2$ as a main component and at least one stabilizing agent. Examples of the stabilizing agent include $Y_2O_3$, CaO, MgO, $CeO_2$, and $Dy_2O_3$. Such partially stabilized zirconia ceramics exhibit excellent wear resistance and are suitably elastically deformable, and therefore advantageous in being secured to the tubular member 8 or the holder 4.

The fiber stub 9a and the plug ferrule 3, if they are formed from zirconia ceramics, for example, can be produced in the following manner. A zirconia ceramic raw material is previously subjected to a predetermined molding process such as injection molding, pressing molding, or extrusion molding to obtain a molded body having a columnar shape or a parallelepiped shape. Thereafter, the molded body is subjected to firing at from 1300° C. to 1500° C., and then the outer peripheral surface is machined or polished to the predetermined dimensions of the fiber stub 9a and the plug ferrule 3. Alternatively, machining, for example, may be performed prior to firing on the molded body to previously form a predetermined shape, and the firing may be performed thereafter.

For the purpose of reducing the splice loss, the front end surfaces of the fiber stub 9a and the plug ferrule 3 are mirror polished to have a curved surface with a radius of curvature of approximately 5 mm to 30 mm. The rear end surface of the fiber stub 9a prevents the generation of reflected light, i.e., light emitted from an optical element, e.g., a laser diode (LD), and reflected on the end surface of the optical fiber 5, to return to the optical element. For this purpose, the rear end surface is polished to be an inclined surface inclined at from approximately 4° to 10° with respect to a plane perpendicular to the axis of the fiber stub 9a.

The sleeve 10 is made of a material such as zirconia ceramics, alumina ceramics, or copper, for example. In view of wear resistance predominantly, a ceramic material such as zirconia ceramics is used in many cases. If the sleeve 10 is formed from, for example, a ceramic material such as zirconia ceramics, the processing method may be as follows. As with the fiber stub 9a described above, a predetermined molding process such as injection molding, pressing molding, or extrusion molding is previously performed to obtain a cylindrical or columnar molded body that forms the sleeve 10. Thereafter, the molded body is fired at from 1300° C. to 1500° C. and is machined or polished to predetermined dimensions. Alternatively, machining, for example, may be performed on the molded body to previously form a predetermined shape, and the firing may be performed thereafter.

In the case where the sleeve 10 is a split sleeve, a machining process is performed after firing to form a slit in an axial direction. Furthermore, the surface roughness of the inside of the sleeve 10 is desirably not greater than 0.2 μm in arithmetic mean roughness (Ra) in view of ease of insertion. Furthermore, the tolerance between the outside diameter of the fiber stub 9a and the plug ferrule 3 and the inside diameter of the sleeve 10 may be not greater than ±1 μm in order to reduce the splice loss. The inside diameter dimension of the sleeve 10 may be designed to result in an insertion force of not less than 0.98 N in order to reliably retain the fiber stub 9a and the plug ferrule 3.

The tubular member 6 and the holder 4 are made of a material such as stainless steel, copper, iron, nickel, plastics, zirconia ceramics, or alumina ceramics, for example. From the standpoint of workability and elasticity, use of a metal material is preferred, and a stainless steel material is often used. The processing method for production may be, for example, to machine a metal wire having an outside diameter larger than that of the tubular member 6 using a lathe, for example.

The adapter 1 is made of a plastics material such as polyetherimide, polysulfone, or polyphenylene sulfide, for example, or a metal material such as stainless steel, copper, iron, or nickel, for example. From the standpoint of formability, the adapter 1 preferably includes a plastics material such as polyetherimide, described above, and is molded by injection molding.

The elastic member 5 is made of a metal material such as an austenitic stainless steel wire, a music wire (carbon steel), a phosphor bronze wire, or a hard drawn wire, for example. A predetermined coil spring can be formed by winding any of these wires in coil form. The elastic member 5 may be made of, for example, an elastic resin tube made of, for example, a styrene-based elastomer, a polyester-based elastomer, an olefin-based elastomer, or a polyamide-based elastomer.

The stopper 6 is formed by, for example, stamping a metal sheet into a predetermined shape. Examples of the metal sheet include an austenitic stainless steel sheet, a cold rolled spring steel sheet, and a phosphor bronze sheet. Furthermore, bending is performed to form the arm portions 6b. The stopper 6 may be molded from an elastic resin such as a polyetherimide resin or a polyethylene naphthalate resin, for example.

The components described above may be assembled in the following manner. First, an optical component assembly is formed by applying pressure to the front end of the fiber stub 9a to press fit the rear end of the fiber stub 9a into the inner hole of the tubular member 8. Next, an optical plug receiver 12-mounted optical element unit 7 is produced by joining the alignment adapter 7b to the tubular member 8 of the optical component assembly and securing the optical element housing package 7a, in which an optical element is housed. Before the alignment adapter 7b is joined, the optical component assembly is moved in the XYZ directions to the position where the optical element in the optical element housing package 7a and the light guide member 9 are optically coupled to each other. Subsequently, the alignment adapter 7b and the tubular member 8 are joined together by, for example, YAG laser welding to be secured.

Furthermore, subsequently, the sleeve 10 is mounted to the front end of the light guide member 9. Then, the adapter 1 is placed onto the sleeve 10 so as to cover the sleeve 10 and inserted as described above to be secured by bayonet mounting.

The optical fiber 2 is secured to the holder 4, to which the plug ferrule 3 has been secured. Subsequently, as described above, the stopper 6 is forced toward the adapter 1, with the elastic member 5 interposed therebetween, to be attached to the adapter 1. The elastic member 5 is placed behind the holder 4 in advance.

With regard to the optical communication module 11, if the optical receptacle thereof is configured to include a sleeve case that covers the fiber stub and the sleeve, there is a possibility that intrusion of foreign matter cannot be coped with adequately and thus foreign matter such as dirt may enter into the sleeve case and the sleeve. In such a case, optical axis misalignment may occur between the plug ferrule and the fiber stub, and as a result, the optical connection may be interfered with. Furthermore, if foreign matter is caught between the optical fiber in the plug ferrule and the optical fiber in the fiber stub, there is a possibility that difficulties may arise in connecting optical signals. In addition, with the configuration described above, there is a possibility that the sleeve case of the optical receptacle and the holder are difficult to detach once they are fitted.

If foreign matter is caught as described above, compressed air will have to be blown thereto to blow off the foreign matter or a dedicated cleaning kit will have to be used to remove the foreign matter, which is not easy. Furthermore, if scratches are generated on, for example, the fiber stub, the optical fiber, or the sleeve, it may become difficult to restore the connection performance of the optical receptacle.

In contrast, in the optical communication module 11 according to the embodiment of the present invention, the adapter 1 can be secured to the projections 8d of the tubular member 8. The adapter 1 can be easily attached and detached or replaced, and also, the sleeve 10 can be easily attached and detached or replaced. When foreign matter is to be removed, the adapter 1 and the sleeve 10 can be detached to expose the light guide member 9, so that foreign matter adhering to the inside can be cleaned off sufficiently. Thus, the optical communication module 11, which can easily recover the connection performance, is provided.

The invention is not limited to the above-described embodiments and examples, and various modifications may be made to the embodiments and examples without departing from the scope of the invention. In the description of the above embodiment, the terms "upper", "lower", and "lateral" are used merely for the purpose of illustrating the positional relationships in the drawings, and are thus not intended to represent actual positional relationships in practical use.

REFERENCE SIGNS LIST

1 Adapter
1a One end (portion)
1b Other end (portion)
1c First groove
1d Axial groove (guide groove)
1e Locking groove
1f Protruding portion
1g Protrusion and recess
2 Optical fiber
3 Plug ferrule
4 Holder
4a Flange 5 Elastic member
6 Stopper
6a Annular portion
6b Arm portion
6c Hook
7 Optical element unit
7a Optical element housing package
7b Alignment adapter
8 Tubular member
8a One end
8b Other end
8c Outer peripheral surface
8d Projection
8e Protruding portion
9 Light guide member
9a Fiber stub
10 Sleeve
11 Optical communication module
12 Optical plug receiver
13 Optical plug
14 Optical receptacle-mounted optical communication module
21 Sleeve case

The invention claimed is:

1. An adapter, comprising:
    a cylindrical component;
    a first groove adjacent to an inner peripheral surface at one end of the cylindrical component, the first groove extending in an axial direction of the cylindrical component and turning in a circumferential direction thereof, the first groove being bent in an L-shape; and
    a locking structure formed on an outer peripheral surface at another end of the cylindrical component, the locking structure defining protrusions and recesses which are configured to allow an optical plug for an optical connector to be locked therein and are disposed in a circumferential direction of the cylindrical component, and the optical plug is configured to be coupled to the adapter.

2. The adapter according to claim 1, wherein the locking structure comprises a second groove comprising an axial groove and a locking groove disposed in the circumferential direction at one end of the axial groove.

3. The adapter according to claim 2, wherein at least one of the first groove and the axial groove of the second groove comprises a plurality of grooves disposed in more than one respective symmetrical locations with respect to a central axis of the adapter.

4. The optical plug configured to be coupled to the adapter according to claim 1, the optical plug comprising:
    a plug ferrule comprising a through hole extending in an axial direction of the optical plug to hold an optical fiber in the through hole from a front end thereof to a rear end thereof;
    a cylindrical holder holding a rear end portion of the plug ferrule on the inner peripheral surface of the cylindrical component;
    an elastic member disposed adjacent to the rear end of the plug ferrule; and
    a stopper comprising:
    an annular portion comprising an opening and a region around the opening, the region being in contact with the elastic member; and an arm portion being bent toward the front end from an outer periphery of the annular portion, the arm portion comprising a hook at the front end of the plug ferrule, the hook is configured to be locked into the locking structure of the adapter.

5. The optical plug according to claim 4, wherein the elastic member comprises a conical coil spring.

6. The optical plug according to claim 5, wherein the arm portion comprises a plurality of arm portions that are rotationally symmetrical with respect to a central axis of the opening of the annular portion.

7. The optical plug according to claim 4, wherein the arm portion comprises a plurality of arm portions that are rotationally symmetrical with respect to a central axis of the opening of the annular portion.

8. An optical communication module comprising:
    an optical communication package comprising an optical element housed therein;
    an optical component assembly comprising:
    a light guide member joined to an exit end of the optical communication package;
    a tubular member holding the light guide member within a through hole of the tubular member; and
    a projection extending outward of the outer peripheral surface of the cylindrical component at one end thereof;
    the adapter according to claim 1 secured to the optical component assembly with the first groove being engaged with the projection of the optical component assembly; and
    the optical plug locked in the locking structure of the adapter.

* * * * *